United States Patent
Sasaki et al.

(10) Patent No.: US 7,243,126 B2
(45) Date of Patent: Jul. 10, 2007

(54) PUSH TYPE SCANNER APPARATUS AND IMAGE DATA TRANSMITTING AND RECEIVING SYSTEM

(75) Inventors: Wataru Sasaki, Osaka (JP); Tatsuo Noda, Osaka (JP); Tokimune Nagayama, Osaka (JP); Kiyoshi Hori, Osaka (JP); Tetsuya Yoshioka, Osaka (JP)

(73) Assignee: Kyocera Mita Corporation, Osaka (JP)

( * ) Notice: Subject to any disclaimer, the term of this patent is extended or adjusted under 35 U.S.C. 154(b) by 680 days.

(21) Appl. No.: 09/938,583

(22) Filed: Aug. 27, 2001

(65) Prior Publication Data
US 2002/0024685 A1 Feb. 28, 2002

(30) Foreign Application Priority Data
Aug. 28, 2000 (JP) .............. 2000-257774

(51) Int. Cl.
*G06F 15/16* (2006.01)
*G06F 15/167* (2006.01)

(52) U.S. Cl. ........ 709/206; 709/203; 709/213; 709/216; 709/245

(58) Field of Classification Search ........ 709/206, 709/200, 203, 227, 213, 216, 219, 245
See application file for complete search history.

(56) References Cited

U.S. PATENT DOCUMENTS

| | | | | |
|---|---|---|---|---|
| 5,333,266 A | * | 7/1994 | Boaz et al. ............ | 709/206 |
| 5,893,101 A | * | 4/1999 | Balogh et al. .......... | 707/100 |
| 6,128,101 A | * | 10/2000 | Saito ..................... | 358/402 |
| 6,167,251 A | * | 12/2000 | Segal et al. ............ | 455/406 |
| 6,189,026 B1 | * | 2/2001 | Birrell et al. ........... | 709/206 |
| 6,321,267 B1 | * | 11/2001 | Donaldson ............. | 709/229 |
| 6,374,291 B1 | * | 4/2002 | Ishibashi et al. ........ | 709/206 |
| 6,442,592 B1 | * | 8/2002 | Alumbaugh et al. .... | 709/206 |
| 6,480,884 B1 | * | 11/2002 | Saito ..................... | 709/207 |
| 6,931,432 B1 | * | 8/2005 | Yoshida ................. | 709/206 |
| 2001/0044828 A1 | * | 11/2001 | Kikinis .................. | 709/206 |

FOREIGN PATENT DOCUMENTS

| | | |
|---|---|---|
| JP | 5-110723 | 4/1993 |
| JP | 9-44526 | 2/1997 |
| JP | 11-355497 | 12/1999 |
| JP | 2000-22739 | 1/2000 |
| JP | 2000-059553 | 2/2000 |
| JP | 2000-151888 | 5/2000 |
| JP | 2000-194621 | 7/2000 |
| JP | 2000-353171 | 12/2000 |

* cited by examiner

*Primary Examiner*—Saleh Najjar
*Assistant Examiner*—B R Bruckart
(74) *Attorney, Agent, or Firm*—Smith, Gambrell & Russell, LLP

(57) ABSTRACT

A push type scanner apparatus according to the present invention can transmit image data read by the push type scanner apparatus through a network to a desired personal computer only by operating the push type scanner apparatus without transmitting any operation command from the personal computer. In the push type scanner apparatus, for transmitting image data, a destination address is specified; a mail to be transmitted to the specified destination address is created; an appended file comprising the image data read by the scanner apparatus and appended to the mail is created; and the created mail and appended file are outputted to the network.

6 Claims, 15 Drawing Sheets

FIG. 4

SELECT DESTINATION | STOP OPERATION

USER NO. (TEN KEY ENTRY)

| 001 ○○○○ | 006 △×○□ | 011 | 016 |
| 002 ××××  | 007 □○△× | 012 | 017 |
| 003 △△△△ | 008 | 013 | 018 |
| 004 □□□□ | 009 | 014 | 019 |
| 005 ○×○× | 010 | 015 | 020 |

1/5 ▼ ▲  SET

E-MAIL TRANSFER

USER NO.   USER NAME          SCROLL BUTTON

FIG. 5

INPUT PASSWORD | STOP

PASSWORD [ ******* ]  (TEN KEY ENTRY)

CLEAR

SET

USER NAME : User Name_A

FIG. 8A

| SELECT CATEGORY | |
|---|---|
| → SECTION DEVELOPMENT SEC. | "SECTION" CANDIDATES<br>GENERAL SEC.<br>ACCOUNTING SEC.<br>TECHNICAL SEC.<br>DEVELOPMENT SEC. |
| RETURN  NEXT | ↑  ↓ |
| FILING LINKING - CATEGORY SELECTION | |

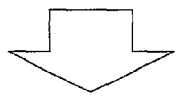

FIG. 8B

| SELECT CATEGORY | |
|---|---|
| SECTION DEVELOPMENT SEC.<br>→ WORK DESIGN-SOFT | "WORK" CANDIDATES<br>MANAGEMENT<br>DESIGN-HARD<br>DESIGN-SOFT<br>DESIGN-MECHANISM |
| RETURN  NEXT | ↑  ↓ |
| FILING LINKING - CATEGORY SELECTION | |

FIG. 9

| ATTRIBUTE DATA : PUSH INPUT AND CHANGE PARTS | | | |
|---|---|---|---|
| DOCUMENT NAME | XXX SOFT SPECIFICATION | KEYWORD4 | |
| | | KEYWORD5 | |
| IMPLEMENTOR | SASAKI | DOCUMENT DATE | 2001.01.20 |
| KEYWORD1 | DOCUMENTATION | | |
| KEYWORD2 | OPERATION FLOW | ACHIEVE TIME LIMIT | 2011.01.19 |
| KEYWORD3 | | | |

DEFINE

FILING LINKING -DOCUMENT DATA INPUT

INPUT SCREEN
PULLDOWN LIST BOX

INPUT DOCUMENT NAME

[XXX SOFT SPECIFICATION ▼]

~KEYBOARD~

[RETURN] [INPUT END]

FILING LINKING -DOCUMENT DATA INPUT

FIG. 11

| | | |
|---|---|---|
| CLASSIFICATION DATA | Cat.1 | DEVELOPMENT SEC. |
| | Cat.2 | DESIGN-SOFT |
| | Cat.3 | |
| | Cat.4 | |
| ATTRIBUTE DATA | Doc.1 | XXX SOFT SPECIFICATION |
| | Doc.2 | SASAKI |
| | Doc.3 | DOCUMENTATION |
| | Doc.4 | OPERATION FLOW |
| | Doc.5 | |
| | Doc.6 | |
| | Doc.7 | |
| | Doc.8 | 2001.01.20 |
| | Doc.9 | 2011.01.19 |

FIG. 12

MAIL DESTINATION (DOMAIN) LIMITING LIST

| ab.co.jp |
|---|
| xyz.ne.jp |
| opqr.com |
| |

FIG. 13

MAIL DESTINATION (DOMAIN) PERMITTING LIST

| aaa.co.jp |
|---|
| bb.ccc.co.jp |
| ddd.com |
| |

FIG. 15

○TEXT WRITING TO BE TRANSMITTED

I OWE YOU MUCH FOR YOUR KINDNESS.
I AM TARO YAMADA OF XXX INC.
I SEND YOU APPENDED DATA.
PLEASE RECEIVE THE SAME.
XXX INC.
(TARO YAMADA)
E-MAIL (yamada@xxxx.co.jp)

FIG. 16

| | NEW | Edit | Delete | |
|---|---|---|---|---|
| No.1 | C : ¥My document ¥Image | | | **** |
| No.2 | C : ¥My document ¥Document | | | **** |
| No.3 | C : ¥My document ¥Other | | | **** |

FIG. 17

| MENU | Network Scanner | | |
|---|---|---|---|
| ——— | Folder-1 | 126.12.22.55 | No.1 |
| ——— | Folder-2 | 126.12.22.55 | No.2 |
| ——— | Folder-3 | 126.12.22.55 | No.3 |

PUSH TYPE SCANNER APPARATUS AND IMAGE DATA TRANSMITTING AND RECEIVING SYSTEM

This application is based on application No. 2000-257774 filed in Japan, the content of which is incorporated hereinto by reference.

BACKGROUND OF THE INVENTION

1. Field of the Invention

The present invention relates to a push type scanner apparatus capable of transmitting image data of an original, which the scanner apparatus has read, trough a network such as a LAN (Local Area Network), the Internet or the like to a specified destination, and to an image data transmitting and receiving system including the push type scanner apparatus at a terminal.

2. Description of the Related Art

In offices and companies, a printer or a digital copying machine has been connected to a LAN to be shared.

When such a connection is adopted, in order to print out a document or image data created in a personal computer, the data are transmitted from the personal computer through the LAN to the printer or the copying machine, and the printer or the copying machine receives the data, then prints the data on a paper sheet and outputs the same.

Further, sometimes a scanner apparatus (including a digital copying machine usable as a scanner) is connected to the LAN. Such a scanner can be also shared similarly to the printer or the copying machine. The scanner can operate on the basis of a command from the personal computer. On the basis of a command from the personal computer, the scanner reads image data and outputs the image data to a personal computer receiving the command.

When such a scanner apparatus is connected, the conventional system operating only by a command from a personal computer PC1 has a disadvantage that it is not easily usable. When a user uses the scanner apparatus, the user, after setting an original to be read on the scanner, has to operate the user's personal computer to give an operation command to the scanner apparatus. Further, after the scanner apparatus reads the original, the user has to go to the scanner apparatus to take back the original. These operations are complicated.

Otherwise, in a structure in which the scanner apparatus preliminarily reads the original and the data read by the scanner apparatus can be stored in a memory of the scanner apparatus, the user has to operate the personal computer so as to read out the image data stored in the scanner apparatus. These operations are also complicated.

An object of the present invention is to provide a push type scanner apparatus capable of transmitting image data, which the scanner apparatus itself has read, through a network.

BRIEF SUMMARY OF THE INVENTION (1) A push type scanner apparatus according to the present invention comprises an original scanner for reading an original set therein and outputting image data of an image on the surface of the original, a network connecting interface for connecting the push type scanner apparatus to a network, an address specifying means for specifying an address designating a destination for transmitting the image data through the network, a mail creating means for creating a mail to be transmitted to the address specified by the address specifying means, an appended file creating means for creating an appended file comprising the image data of the original read by the original scanner to be appended to the mail created by the mail creating means, and a transmission executing means for outputting the created mail and the appended file from the network connecting interface to the network.

According to the structure of this push type scanner apparatus, created in association with an address specification executed by the address specifying means is a mail to be transmitted to the specified address. Further when an original is read in association with the address specification, the read image data of the original are made into an appended file of the mail. And the created mail and the appended file thereof are transmitted to the specified address.

Therefore, image data read by the original scanner can be transmitted in an appended file form to a destination personal computer only by operating the push type scanner apparatus without need of operating the destination personal computer. That is, since image data are sent from the scanner apparatus side, this scanner apparatus is called "push type".

As the result, the present invention can provide a scanner apparatus having good operability and being easy to use.

As a way of address specification in this scanner apparatus, a way comprising preliminarily storing a plurality of addresses in an address memory and selecting a desired one of them can be adopted, similarly to a way of mail address specification in a personal computer.

Otherwise, a structure may be adopted in which each time an address can be entered by enter keys.

Further, if the association of the address specification and the original reading is limited to a case the original reading is executed after the address specification, the image data of the original can be transmitted to the specified address only by specifying the address to which the image data are to be transmitted and executing the original reading without need of any other associating operation.

Further, the association of the address specification and the original reading may be executed, for example, by operating a specific operation key, by setting the scanner apparatus in a predetermined mode and operating the same, or the like.

(2) A push type scanner apparatus according to the present invention may further comprise an address book data obtaining means for obtaining address book data from any data processing apparatus connected to the abovementioned network, and the address specifying means may specifying a destination address from the address book data obtained by the address book data obtaining means.

According to this structure, since the push type scanner apparatus can obtain the address book data from the terminal data processing apparatus, an operator can select the destination address from the obtained address book data. The image data are transmitted to the selected destination address. Consequently, it is not necessarily required to preliminarily register the destination address data. Therefore, it is not necessary to install a large capacity memory for registering the destination address data. As a result, a low cost push type scanner apparatus can be realized.

Further, when the push type scanner apparatus is shared by a number of users, each user can transmit image data, for example, by obtaining address book data from his data processing apparatus connected to the network and selecting a destination address from the address book data. Accordingly, since it is not necessary to install a memory for registering a number of destination address data in the push type scanner apparatus and in addition, operation of selecting a destination address can be efficiently executed, the operability of the push type scanner apparatus can be improved.

Further, even when a plurality of push type scanner apparatus are connected to the network, it is not necessary to individually register destination address data in each of the push type scanner apparatus. Thereby, operations of inputting and renewing the destination address data by an administrator or the like can be reduced.

(3) A push type scanner apparatus according to the present invention may further comprise an additional data inputting means for inputting additional data to be added to image data for database processing.

According to the present invention, it is possible to input additional data for database processing from an operation panel of the scanner apparatus, and the additional data and the image data inputted by the original scanner are transmitted to a terminal data processing apparatus. Thereby, it is possible to surely correspond accurate additional data to the image data by the operation on the scanner apparatus side without need of using forms or the like. As a result, database processing in the data processing apparatus can be facilitated, and for example, such database processing can be automated.

"Database processing" here means to process data stored in the database. For example, database processing includes retrieving image data on a certain retrieving condition, or displaying list of image data, etc. When the database in the data processing apparatus is of such a kind that image data are classified by the hierarchy structure, the abovementioned additional data inputting means preferably includes a means for selecting the registered classification data by the hierarchy structure (FIG. 8A, FIG. 8B).

Further, when the database in the data processing apparatus is of such a kind that the registered image data is retrieved by using attribute data comprising characters or symbols as a retrieval key, the abovementioned additional data inputting means preferably includes a means (FIG. 9: keyboard) for creating attribute data comprising characters or symbols by key entry.

(4) Preferably a push type scanner apparatus according to the present invention further includes a storing means for storing the destination addresses to which image data transmission is limited on the basis of the domain name of each of the said destination addresses, and a transmission limiting means for limiting image data transmission to a destination address by corresponding the domain name of the destination address to the domain names stored in the storing means.

According to this structure, it is decided on the basis of the domain name of a destination address whether to limit the image data transmission thereto or not, and the image data are not transmitted to the address to which the image data transmission is limited. Thereby, it is possible to prevent the mail server on the receiving side from being excessively loaded.

An image data input and transmission apparatus according to the present invention may include a storing means for storing the destination addresses to which the image data transmission is permitted on the basis of the domain name of each of the said destination addresses, and a transmission permitting means for permitting the image data transmission to a destination address by corresponding the domain name of the destination address to the domain names stored in the storing means.

According to this structure, it is decided on the basis of the domain name of a destination address whether to permit the image data transmission to the destination address or not, and the image data is transmitted only to the permitted addresses. Thereby, it is possible to prevent the mail server on the receiving side from being excessively loaded.

(5) Preferably a push type scanner apparatus according to the present invention further comprises a set expression storing means for storing mail set expressions used for creating a text writing of a mail.

According to this structure, users of the push type scanner apparatus are provided with facilitation and convenience of the operation, and at the same time they can effectively utilize the limited memory area.

(6) A push type scanner apparatus according to the present invention comprises an original scanner for reading an original set therein and outputting image data of an image on the surface of the original, a network connecting interface for connecting the push type scanner apparatus to a network, a personal computer specifying means for specifying a specific personal computer connected to the network, and a transmission executing means for transmitting, when the original is read by the original scanner in association with the personal computer specification executed by the personal computer specifying means, the image data of the original read by the original scanner to the specified personal computer.

According to this structure, the image data can be directly to the personal computer, unlike the case of the abovementioned (1) in which the image data are transmitted in the form of an appended file appended to a mail. The image data transmission can be also executed only by the operation of the scanner apparatus without need of operation from the personal computer. The personal computer receives the image data and stores the same in a specific file form.

Therefore, since the image data can be transmitted to a specified personal computer only by operating the scanner apparatus, the scanner apparatus has an excellent operability.

Especially when a user wants to store image data of a plurality of original sheets in a memory of his personal computer, he has only to set the original sheets in the scanner apparatus according to the present invention, specify his own personal computer, and let the scanner apparatus read the originals. Thereby all the image data of the originals read by the scanner apparatus are transmitted to his personal computer and stored in the memory of his personal computer. Therefore, the scanner apparatus is easy to use.

(7) A push type scanner apparatus according to the present invention is provided with both of the functions described in the abovementioned (1) and (6). It is more useful that the two functions of the scanner apparatus can be changed over to use.

(8) An image data transmitting and receiving system according to the present invention is an image data transmitting system including a push type scanner apparatus capable of transmitting image data through a network and a data processing apparatus connected to the network, and the push type scanner apparatus comprises an original scanner for reading an original set therein and outputting image data of an image on the surface of the original, a network connecting interface for connecting the push type scanner apparatus to the network, an image data storing folder specifying means for specifying an image data storing folder of a data processing apparatus connected to the network by an address on the network, and a transmission executing means for transmitting, when the original is read by the original scanner in association with the image data storing folder specification executed by the image data storing folder specifying means, the image data of the original read by the original scanner to the data processing apparatus, the data processing apparatus being provided with an image data receiving software on the operating system, in which the location of the image data storing folder for storing image data is registered, the image data receiving software being used for receiving the image data transmitted from the scanner apparatus and storing the same in the image data receiving folder.

According to this structure, it is possible to transmit the image data read by the push type scanner apparatus from the push type scanner apparatus directly to a user's data processing apparatus using an address on the network.

And the user can store the image data in a folder unshared on the network without aid of any server. Since the location of the folder can be kept private, the image data can be prevented from being viewed by others.

Further, the system may be such that the image data transmission to the data processing apparatus having the image data storing folder for storing the image data is permitted when the user enters a valid password. Thereby, it can be also prevented that, on operation of the push type scanner apparatus by any other person than the user, unnecessary data are transmitted from the push type scanner apparatus and stored in the image data storing folder in the data processing apparatus.

Further, in the image data transmitting and receiving system according to the present invention, the image data storing folder may be specified by using the name or the number, as well as the address on the network, of the image data storing folder. It is very convenient for the user to specifying the image data storing folder by using the name or the number thereof.

In this case, the system may be also such that the image data transmission to the data processing apparatus having the image data storing folder for storing the image data is permitted when the user enters a valid password.

Now, embodiments of the present invention will be described in the following with reference to the appended drawings.

BRIEF DESCRIPTION OF THE DRAWINGS

FIG. 4 is a view showing a user data input screen.

FIG. 5 is a view showing a user password input screen.

FIGS. 8A and 8B are views for explaining additional data input operation.

FIG. 9 is a view showing an attribute data input screen.

FIG. 11 is a view showing a data form of additional data.

FIG. 12 is a view showing an example of a mail destination limitation list written in the address memory 16.

FIG. 13 is a view showing an example of a mail destination permitting list written in the address memory 16.

FIG. 15 is a view showing an example of a text writing composed of component sentences is shown.

FIG. 16 is a schematic view showing an example of a folder setting screen displayed on each personal computer by the image data receiving software.

FIG. 17 is a schematic view showing an example of a Web Page (destination administrating data registering screen) provided by the digital copying machine 1 when a predetermined user accesses the digital copying machine 1 using the Web Browser function of any one of the personal computers.

DETAILED DESCRIPTION OF THE INVENTION

Figure 1:
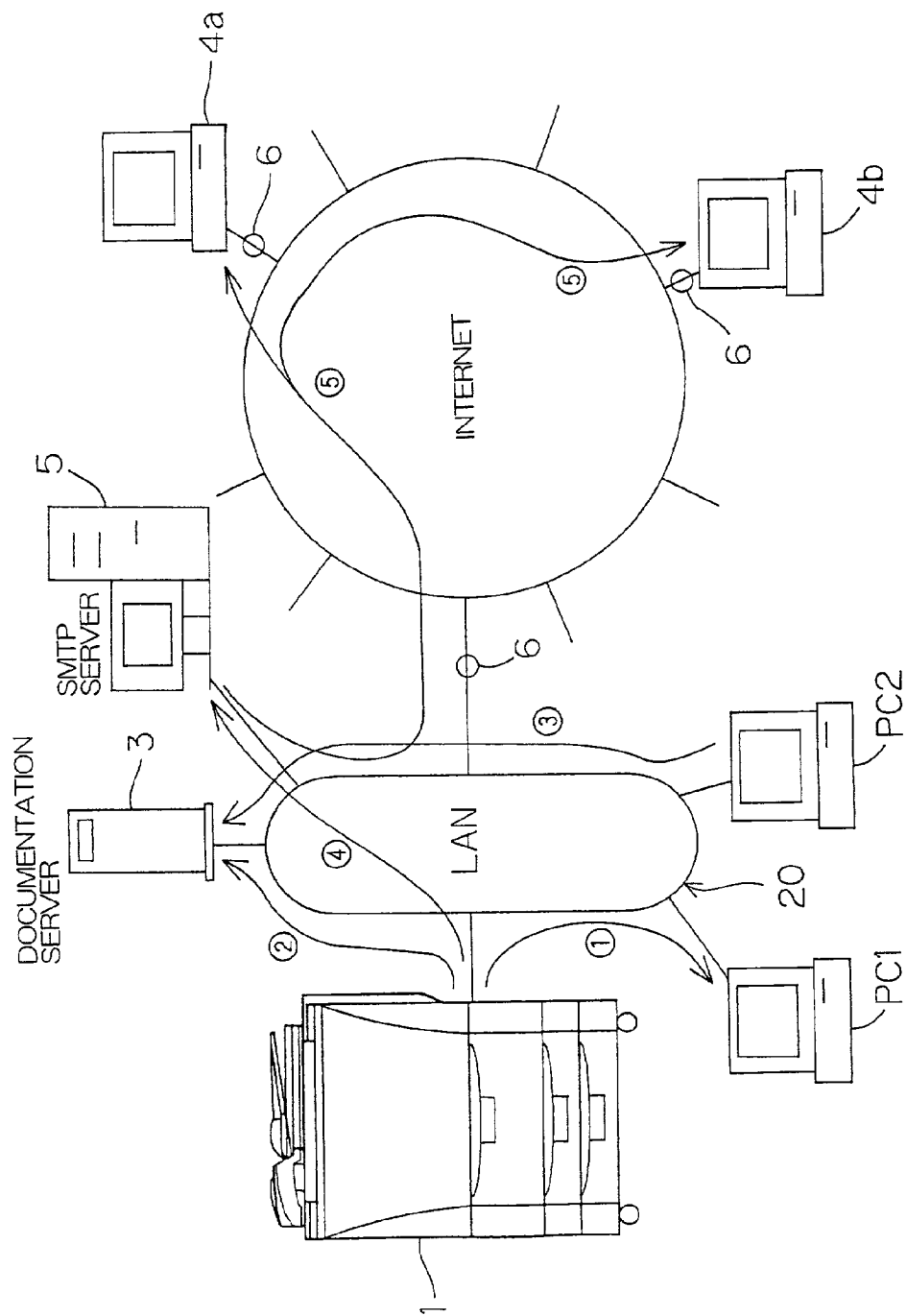
FIG. 1 is a view showing the connection structure of a network including a push type scanner apparatus according to an embodiment of the present invention.

FIG. 1 is a view showing a network connection structure including a push type scanner apparatus according to an embodiment of the present invention.

In FIG. 1, a digital copying machine 1 is used as a push type scanner apparatus. The digital copying machine 1 is connected to a LAN 20. The LAN 20 is a network connecting, for example, a plurality of personal computers PC1, PC2 and a documentation server 3 provided in an office to one another. A SMTP server (Simple Mail Transfer Protocol Server) 5 is connected to the LAN 20.

The LAN 20 is further connected, through a gateway and a firewall 6 at need, to the Internet 6. And external personal computers 4a, 4b are connected through the Internet to the LAN 20.

In such a network connection structure, the digital copying machine 1 can read an original and transmit (deliver) image data of the original to a desired personal computer PC1 (arrow ①). This data transmission (delivery) can be executed only by operating the digital copying machine 1 without need of operating the personal computer PC1.

Further, the digital copying machine 1 can transmit image data of the original read by the digital copying machine 1, for example, to the documentation server 3 installed in the office (arrow ②). This transmittal can be also executed only by operating the digital copying machine 1 without operating the documentation server 3.

The image data stored in the documentation server 3 can be read and retrieved by the personal computers PC1, PC2 connected to the LAN 20 (arrow ③).

Further, the digital copying machine 1 can read an original and transmit the image data of the original in a mail form, to the SMTP server 5 on the LAN 20 (arrow ④). This transmittal can be also executed only by operating the digital copying machine 1.

The SMTP server 5 receives the mail from the digital copying machine 1 and delivers the mail body and an appended file attached to the mail body to the external personal computers 4a, 4b the addresses of which are specified by the mail (arrow ⑤).

Figure 2:
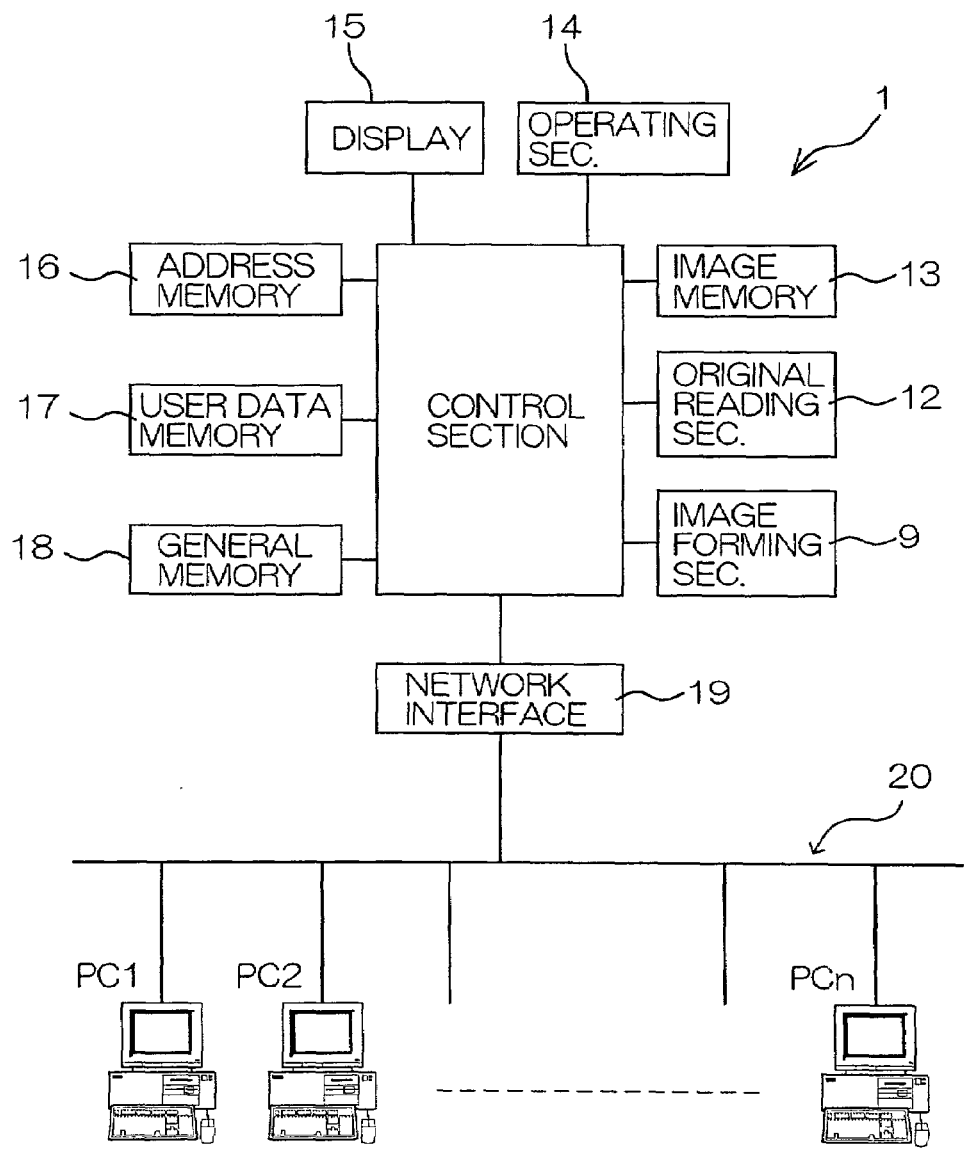
FIG. 2 is a block diagram explaining the structure of the push type scanner apparatus.

FIG. 2 is a block diagram showing the structure of the digital copying machine 1 of FIG. 1. The digital copying machine 1 includes a control section 11 constituted by a microcomputer and the like. The control section 11 controls an original reading section 12 and an image forming section 9. Further, an image memory 13 for storing image data read by the original reading section 12 is provided. The image memory 13 is controlled by the control section 11. Therefore, the image data read by the original reading section 13 is stored in the image memory 13 and the image data are fed from the image memory to the image forming section 9, so that a copy (form) on which a copy image of the original has been formed can be obtained.

The control section 11 is connected through a network interface 19 to the LAN 20. A plurality of personal computers PC1, PC2, . . . , PCn (n being an integer equal to or larger than 1) are connected to the LAN 20. As a result, the digital copying machine 1 can function as a network scanner and network printer shared by the plurality of personal computers PC1, PC2, . . . , PCn. That is, the digital copying machine 1 can transmit image data of an original read by the original reading section 12 through a network interface 19 to an arbitrary personal computer PCi (i=1, 2, . . . , n) on the LAN (network scanner function). Further, the digital copying machine 1 can receive image data from an arbitrary personal computer PCi on the LAN and can form an image corresponding to the image data on a form by the operation of the image forming section 9 (network printer function).

Further, the digital copying machine 1 includes an operating section 14 so that a user can make various kinds of operations. The user can enter or select an address, specify a personal computer and the like. Further, the digital copying machine 1 includes a display section 15 for displaying operation data and other contents, which is constituted by a liquid crystal display panel or the like. The display section 15 is controlled by the control section 11. The operating section 14 includes, in addition to enter keys such as ten keys, a touch panel disposed on the display surface of the display section 15.

Further, connected to the control section 11 is an address memory 16 storing addresses which are destination data shared by a plurality of users. A user data memory 17 is also connected to the control section 11. In the user data memory 17, user data of the personal computers PC1~PCn connected to the LAN 20 and the corresponding IP addresses of the personal computers PC1~PCn are registered in correspondence with each other. Further, connected to the control section 11 is a general memory 18 for temporarily storing address data and the like.

Furthermore, a network interface 19 is connected to the control section 11. The digital copying machine 1 is connected through the network interface 19 to the LAN 20.

Figure 3:
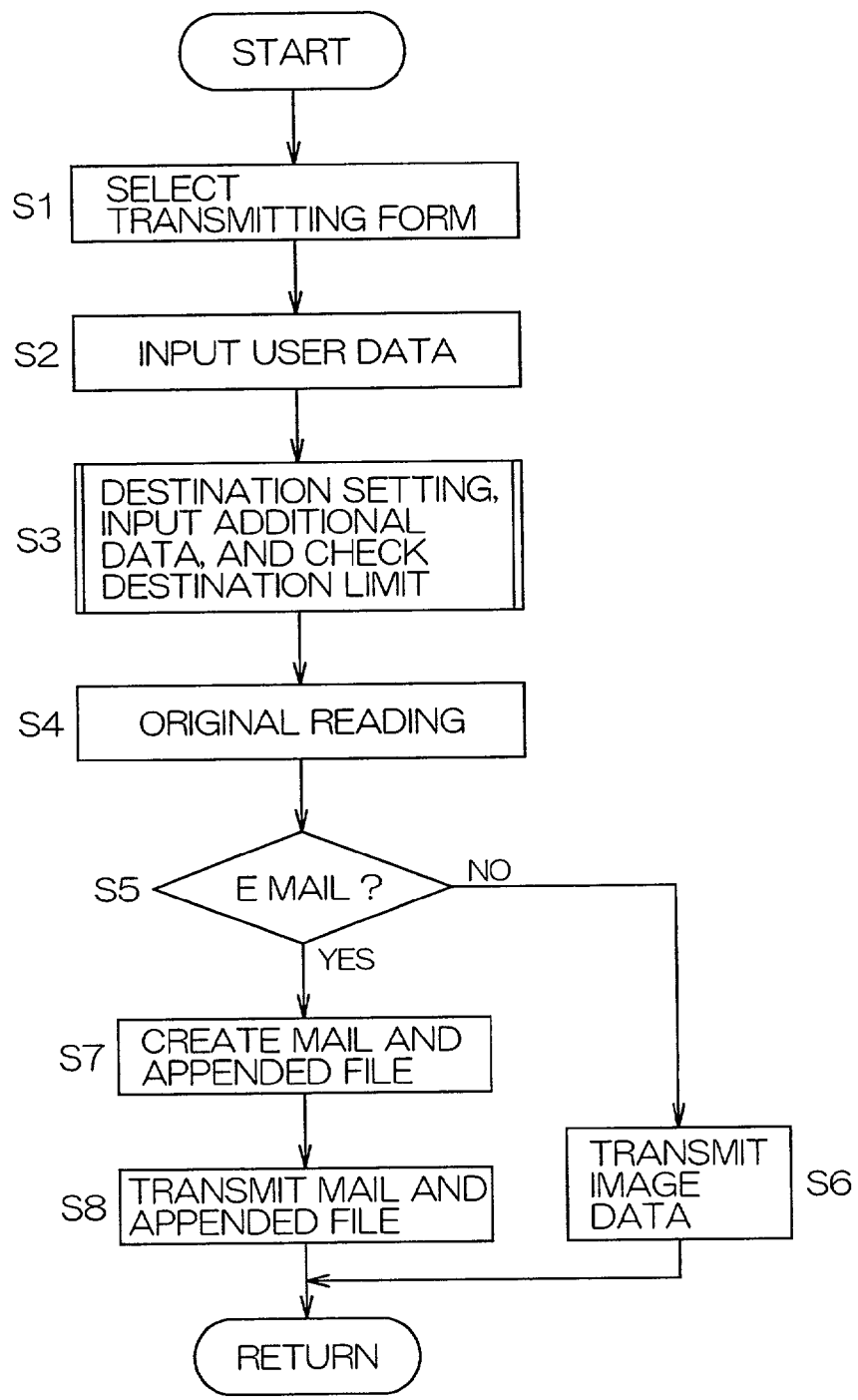
FIG. 3 is a flow chart showing control operation of the control section.

FIG. 3 is a flow chart for explaining the operation of the digital copying machine 1 used as a push type scanner. When an operator selects the scanner function by operating the operating section 14 and selects a transmitting form of image data (whether transmitting the image data in a form of an electronic mail or transmitting the image data directly) (step S1), a user data input screen shown in FIG. 4 is displayed on the display 15 (step S2).

On the user data input screen, a plurality of user selecting buttons showing user numbers and user names are arranged and displayed. A touch panel is disposed on the surface of the display 15 as abovementioned, and when the operator selects and pushes any user selecting button, user data of the pushed user selecting button are inputted (step S2). Instead of such operation, user data can be also inputted by entering a user number from the ten key provided on the operating section 14. If the user selecting button corresponding to the user name of the operator is not displayed on the user data input screen, the operator can find out the user selecting button corresponding to his user name by operating a scroll button.

By thus inputting the user data, a user password input screen shown in FIG. 5 is displayed on the display 15. Each user can set a password at need. When a user has set a password, the operator enters the predetermined password by ten key entry or the like and operates by pushing set buttons, the user data entry becomes effective.

Figure 6:
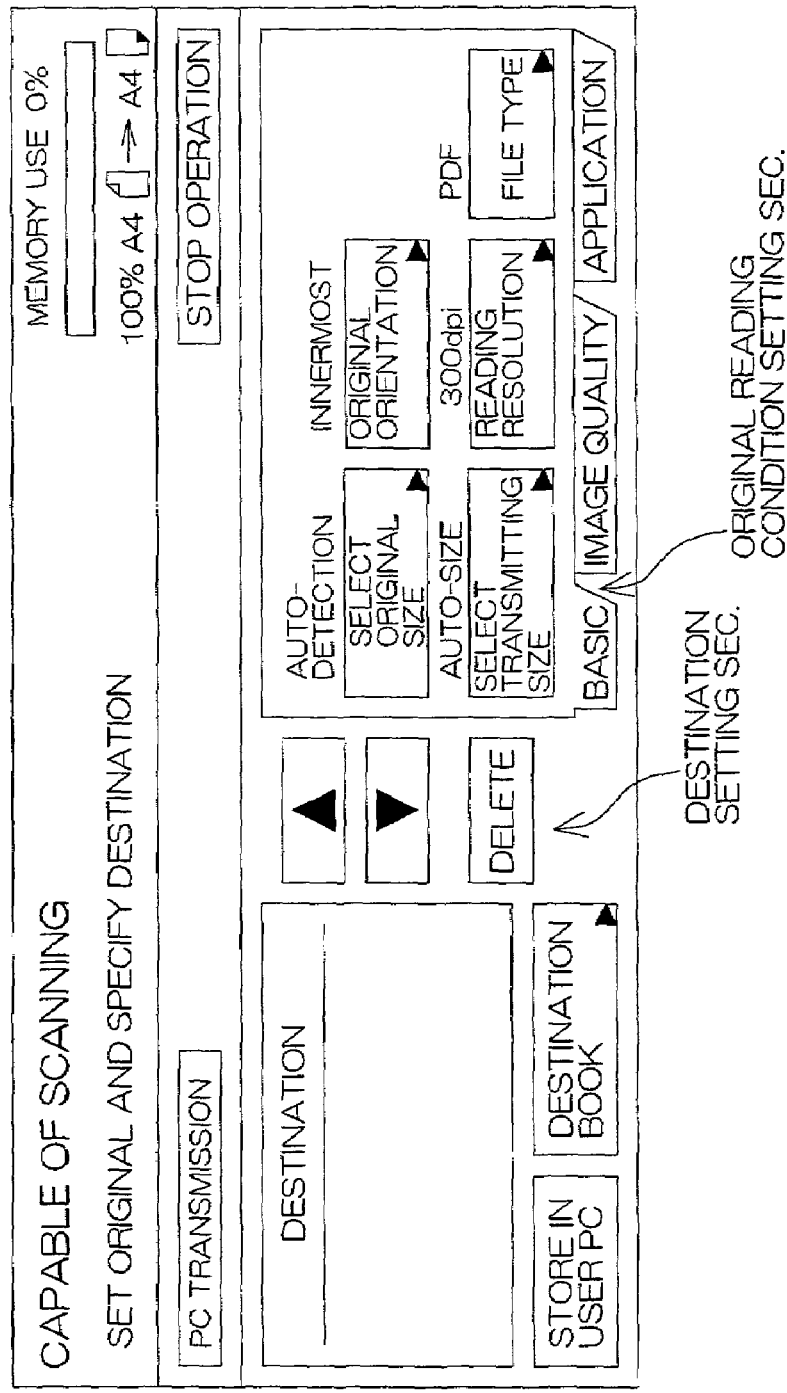
FIG. 6 is a view showing a scanner function basic screen.

When the user data entry becomes effective, a scanner function basic screen shown in FIG. 6 is displayed on the display 15. By making predetermined operations on the scanner function basic screen, a destination address for transmitting the image data can be set (step S3).

The scanner function basic screen includes an original reading condition setting section and a destination setting section as shown in FIG. 6. In the destination setting section, a "Store in User's PC" button and a "Destination Book" button are provided. The "Store in User's PC" button is operated when image data are sent to a user's personal computer corresponding to the user data entered at step S2 in FIG. 3.

When the "Store in User's PC" button is operated, the control section 11 reads out, from the user data memory 17, an IP address of the personal computer corresponding to the user concerned, and sets the IP address as the destination for transmitting the image data.

Figure 7:
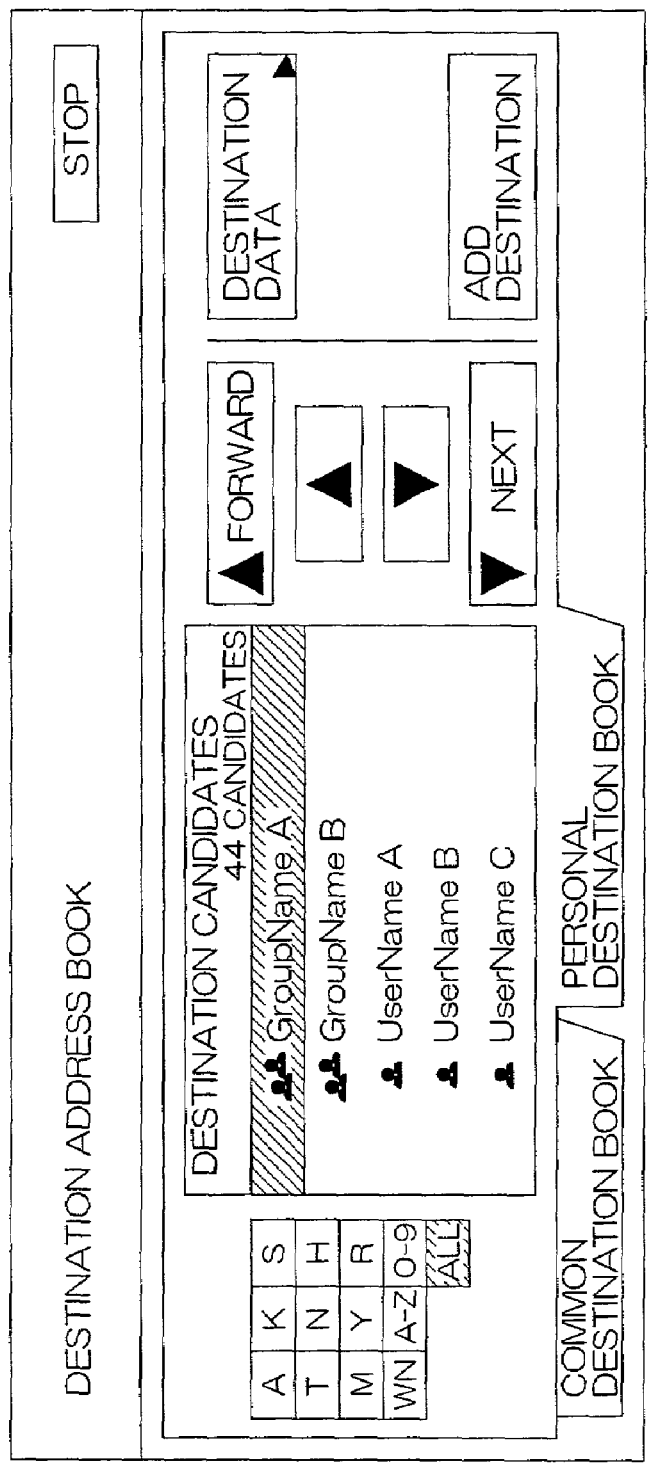
FIG. 7 is a view showing a destination selecting screen.

When the "Destination Book" button is operated (YES at step S13), the destination selecting screen shown in FIG. 7 is displayed on the display 15. On this destination selecting screen, a "personal destination book" display and a "common destination book" display can be changed over by operating a tab.

The "common destination book" is used for selecting destinations registered in the address memory 16 of the digital copying machine 1. On the other hand, the "personal destination book" is a destination book (address book data) preliminarily set in a personal computer corresponding to the user data entered at step S2 in FIG. 3.

When the "personal destination book" tub is operated, an address (IP address) of a personal computer corresponding to the user data entered at step S2 in FIG. 3 is read out of the user data memory 17. With respect to this address, the control section 11 transmits an address book data requesting signal through the network interface 19 to the network. On receiving the address book data requesting signal, an address book software of the corresponding personal computer outputs address book data set in the said personal computer. The address book data are obtained by the control section 11 of the digital copying machine 1 through the network interface 19, and stored in the general memory 18. The address book data stored in the general memory 18 are displayed on the display 15 as destination candidates in the personal destination book.

The operator selects an intended destination from the destination candidates in the personal destination book displayed on the display 15, and sets the same as the destination for transmitting the image data. One or more destinations can be selected from the personal destination book and a destination candidate selection screen (FIG. 7) of the common destination book. By pushing a "destination addition" button after thus selecting the destination, the destination for transmitting the image data is defined.

When the "common destination book" tab is operated, the control section 11 reads out the destination book from the address memory 16 of the digital copying machine 1 and displays the same on the display 15. By selecting one or more destinations from the displayed destination candidates and operating the "destination addition" button, the destination for transmitting the image data can be set.

In the digital copying machine 1, by obtaining address book data from any of the personal computers PC1~Pcn connected to the LAN 20, the destination for transmitting the image data can be set using the address book data as abovementioned. Accordingly, it is not necessary to store a number of destination data in the address memory 16 of the digital copying machine 1, and therefore the capacity of the address memory 16 need not be so large. As the result, the cost of the digital copying machine 1 can be lowered.

Further, since each user can obtain, in the digital copying machine 1, the address book data which he has made for his own use on his personal computer and select a destination, he can execute the destination setting operation easier than in the case in which destinations of a number of users are all registered in the address memory 16. Further, even if a plurality of network scanner equipments are connected to the LAN, the administrator need not register or renew destination data relative to all of the network scanner equipments.

In the abovementioned embodiment, the address memory 16 for registering address data to be displayed on the common address book is provided in the digital copying machine 1. However, the address memory 16 need not be provided in the digital copying machine 1, but address book data to be displayed on the common address book may be obtained from any computer (for example, the documentation server 3 or a personal computer of the administrator).

Now, operation of entering additional data to be added to the image data will be described in the following.

By operating the display 15 and the operating section 14, the digital copying machine 1 operates so as to accept entry of classification data and attribute data as the additional data to be added to the image data. Here, when data classified by hierarchical structure are stored, the classification data include the classification name of each hierarchical structure. Further, when attribute data can be retrieved by keywords made of letters or symbols or attributes, the attribute data include these keywords or attributes.

Classification data or attribute data capable of being input in the digital copying machine 1 can be edited from the personal computers PC1~PCn using an administrating/editing tool software.

FIGS. 8A and 8B are views for explaining the additional data input operation in the digital copying machine 1.In this case, the control section 11 displays a screen shown in FIG. 8A on the display 15. A touch panel is provided on the surface of the display 15. By pushing the touch panel at positions of operation buttons or the like displayed on the display 15, predetermined input operation can be executed.

In FIG. 8A, a classification selecting screen is shown. In this classification selecting screen, a category selecting screen for selecting "section" as a first category, and on the right side thereof, a plurality of the first category "section" candidates re displayed in a form of a list. An up-scroll button and a down-scroll button are provided below the section candidate list, and the operator can scrolls the section candidate list by operating the scroll buttons. By selecting an intended candidate from the section candidate list and pushing the same, the display of the candidate is reversed and the characters of the selected candidate are entered.

When the first category "section" is entered in such a manner, the operator operates a "next" button, and transfers the screen to one for selecting the next category "work" (see FIG. 8B). In order to change a before-selected category, the operator has only to operate "return" button. By executing similar operations, the operator can select and input a plurality of categories in order.

After entering the classification data, the control section 11 controls the display 15 so that an attribute data input screen is displayed on the display 15.

FIG. 9 shows the attribute data input screen. In the example of FIG. 9, the document name, the implementor, the keywords 1~5, the document date and the achieve time limit can be inputted as the attribute data.

By touching each column with the finger to reverse the same, an input screen appears. This input screen includes a pull-down list box and a keyboard. In the pull-down list box, data inputted in the past are shown, and by selecting the relevant ones, the operator can input the attribute data. In the keyboard input section, for example, the alphabet buttons and the like are displayed, so that the operator can execute Japanese character input through Roman character input. This input screen further includes a "return" button for canceling inputted data and an "input end" button for defining inputted data.

Figure 10:
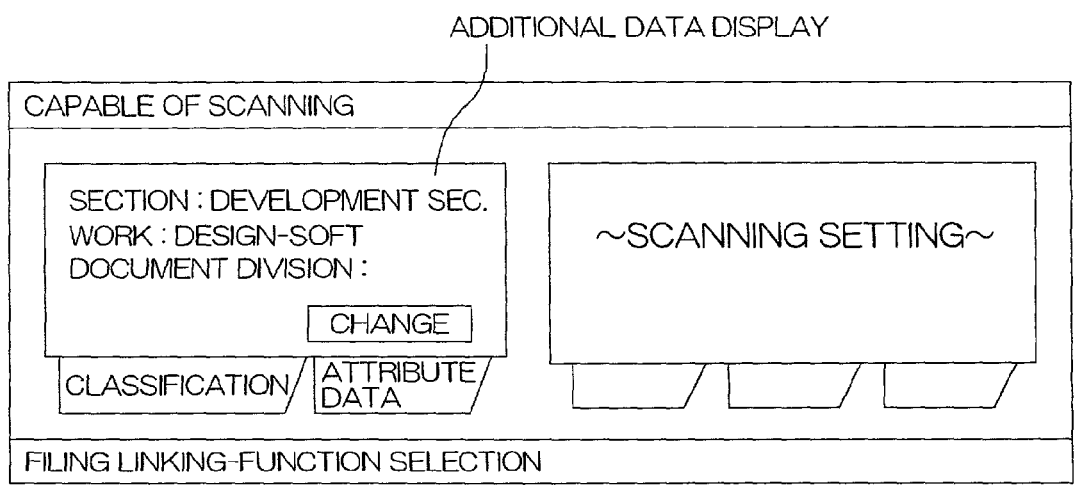
FIG. 10 is a view showing a read setting screen.

By operating "defined" button, the attribute data are set and the display is changed over to a read setting screen shown in FIG. 10.

The read setting screen shown in FIG. 10 includes a scanning condition setting section on the right side and an additional data display section on the left side. Provided in the additional data display section are a classification data tab and an attribute data tab for confirming classification data and attribute data respectively. In order to change these data, the operator operates a "change" button to return to the classification selecting screen or the attribute data input screen shown in FIG. 8A, FIG. 8B or FIG. 9.

FIG. 11 is a view showing data forms of the additional data. The additional data include each field of the classification data Cat.1~4 and the attribute data Doc. 1~9. Stored in the fields are the classification data and the attribute data inputted on the classification selecting screen and the attribute data input screen respectively.

By reading an original after inputting the classification data and the attribute data using the network scanner function of the digital copying machine 1 as abovementioned, the image data can be automatically registered in the user's personal computer. In this case, since a predetermined form sheet need not be used, forms are not wasted. Further, since OCR operation and the like are not necessary, loads of the digital copying machine 1 and the personal computer can be reduced and a variety of troubles caused by erroneous recognition occurring in OCR operation can be avoided. Furthermore, since the image data and the additional data can be corresponded to each other in the digital copying machine 1 in this case, no error occurs in such correspondence, unlike a case of corresponding the image data to the additional data on a personal computer.

Thus, the operator can easily register the image data and the additional data by only operating the digital copying machine 1.

Among the abovementioned additional data, the classification data can be used for retrieving data utilizing hierarchical structure, and the attribute data can be used for retrieving any data on a basis of a keyword made of characters or symbols or the like.

Now, how to limit mail destinations will be described in the following. For this purpose, a mail destination limiting list or a mail destination permitting list is used.

FIG. 12 shows an example of a mail destination limiting list written in the address memory 16. This list limits destinations for transmitting the image data on the basis of the domain of each mail destination address. This writing is executed for each address. However, by using a wild card, all the addresses including, for example, "ne. jp" such as "**. ne. jp" can be written in a lump in the destination limiting list.

FIG. 13 shows an example of a mail destination permitting list. This mail destination permitting list permits to transmit a mail to the destinations on the basis of the domain of each mail destination address. However, addresses can be written in a lump in the list using a wild card, similarly as abovementioned.

Figure 14:
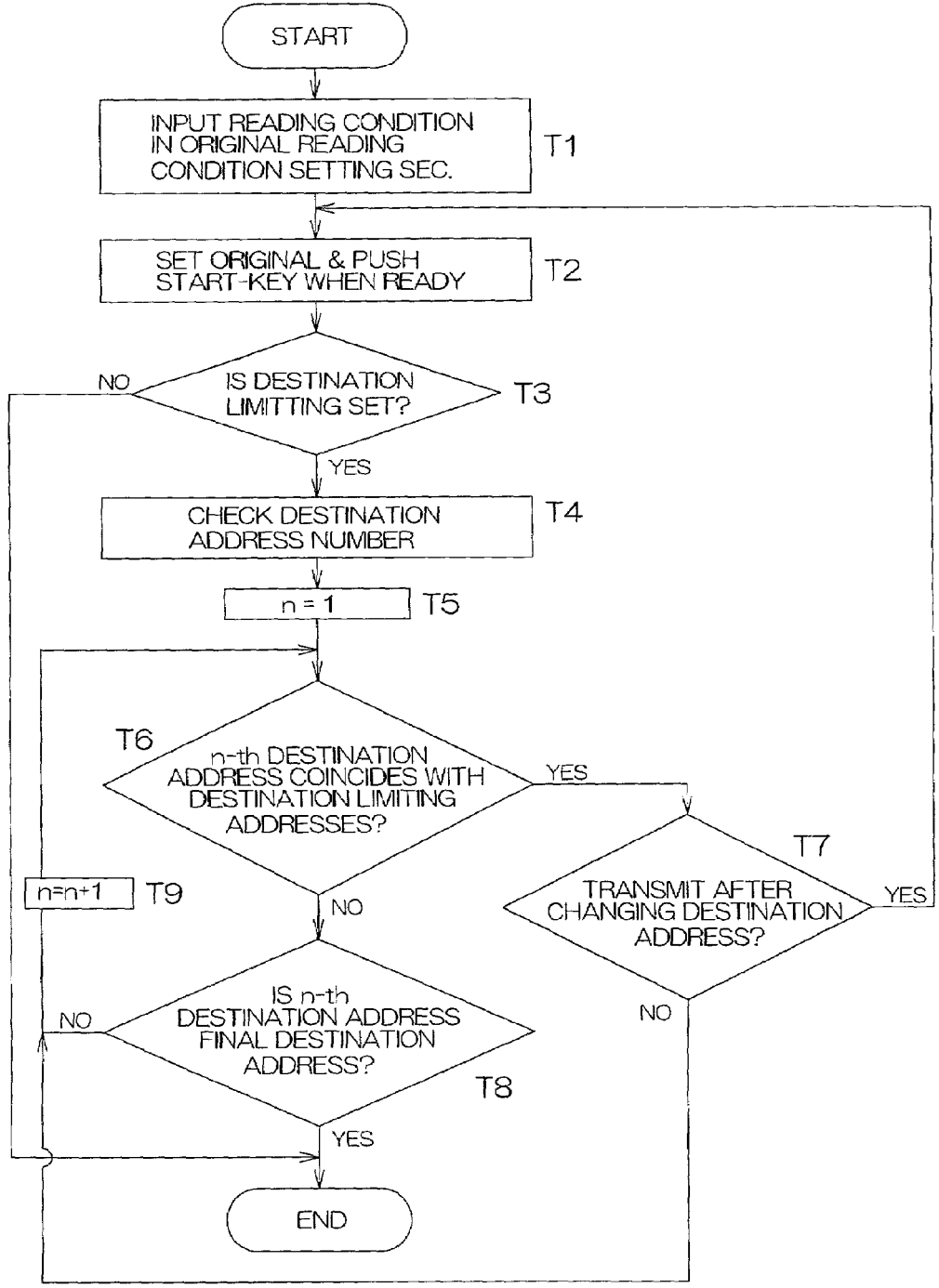
FIG. 14 is a flow chart of transmitting operation in the case of limiting mail transmission on the basis of the mail destination limitation list.

FIG. 14 is a flow chart of transmitting operation executed by the control section 11 in the case of limiting mail transmission on the basis of the mail destination limiting list.

First, original reading conditions are inputted in the original reading condition setting section shown in FIG. 6 (step T1). The original reading conditions include, for example, the resolution (600, 400, 300, 200 dpi), the original mode("photograph mode", "text mode", "color mode" or the like), the original size (A3, A4 or the like).

A user sets an original, and after completing the original setting, the user pushes a start key (step T2).

The control section 11 judges whether the destination limitation setting has been executed or not (step T3). The destination limitation setting is to preliminarily set whether to limit the image data transmission on the basis of the domain name of the destination address or not, and the administrator executes the destination limitation setting at the time of initialization of the image data inputting, transmitting and receiving apparatus or the like.

The control section 11 checks the number of the inputted destination addresses, and regards the number as N (step T4).

To begin with, it is checked whether the domain name of the first destination address is limited or not on the basis of the abovementioned mail destination limiting list (step T6).

When the domain name is limited, the program proceeds to step T7. And at step T7, it is displayed through the operating section 14 to the user whether to transmit the data by changing the destination address or not. The user is informed by the display that the data cannot be transmitted to the address concerned, and the user can take a measure of, for example, changing the address. This measure is effective when the destination concerned has more than two addresses.

Then, it is checked whether the domain names of the second and downward destination addresses are limited or not on the basis of the abovementioned mail destination limiting list (step T7). When all addresses are checked (YES at step T8), the program proceeds to the original reading procedure (FIG. 3; step S4).

That is, by setting the original on the original reading section 12 and operating the start button provided in the control section 11, the image on the surface of the original is read (step S4). Thereby, the original reading section 12 produces image data. The produced image data are stored in the image memory 13.

The following procedure is branched in accordance with the transmission form selected at step S1. That is, when direct transmission of the image data is selected (NO at step S5), the control section 11 reads out the image data from the image memory, and transmits the image data through the network interface to an address or addresses set at the destination setting step (step S3) as the destination or destinations (step S6).

On the other hand, when an electronic mail (E-mail) is selected as the transmission form (YES at step S5), the E-mail body and an appended file to be attached to the E-mail body are formed. The E-mail body may be, for example, a set expression such as "Dispensing with the preliminaries. I send you appended images. Yours sincerely." or an arbitrary expression. The appended file is a file of the image data read by the original reading section 12 and stored in the image memory 13. The appended file may be a data file in the form of the image data as they are, or a data file obtained by compressing the image data in a predetermined form.

The E-mail body and the appended file are transmitted to the E-mail address or addresses set at the destination setting step (step S3)(step S8).

By storing the transmission date, the sender, destination, transmitted image data size as a log, the administrator can be informed what image data has been transmitted to the destination.

Now, the storing structure of set expressions for E-mail will be described in the following.

Such a set expression is constituted by a plurality of component sentences. They are, for example, "I owe you much for your kindness." "I am ( ) of Inc." "I send you appended data. Please receive the same." "I trust it to your discretion." "Inc." and "E-mail:".

A user can extract some component sentences from the text data stored in the memory, and compose the same. Thereby, the user can create a text writing having his intended content and send the same.

With this structure, users of the push type scanner apparatus are provided with facilitation and convenience of the operation, and at the same time they can effectively utilize the limited memory area.

In FIG. 15, an example of a text writing composed of the said component sentences is shown.

Now, description is given to a function of setting a folder (hereinafter referred to as image data storing file) for storing image data read by the digital copying machine 1 as an image file, and a function of receiving image data transmitted from the digital copying machine 1 and storing the image data as an image file in a predetermined image data storing folder.

These functions are realized by a software (application on the OS) for receiving image data installed in each of the personal computers PC1~PCn.

The digital copying machine 1 has a function of providing a Web Page for registering destination administrating data therein when a user accesses using Web Browser from any of the personal computers PC1~PCn. Further, the digital copying machine 1 has a function of transmitting image data which the digital copying machine 1 has read to any of the personal computers PC1~PCn having a destination file specified by the user on the basis of the user's destination folder selecting operation. These functions are realized by image data transmission control software of the digital copying machine 1.

FIG. 16 shows an example of a folder setting screen displayed on each of the personal computers PC1~PCn by the image data receiving software.

The user of each of the personal computers PC1~PCn registers, on the folder setting screen, the image data storing folder for storing image data read by the digital copying machine 1 as an image file. In this example, a plurality of image data storing folders can be registered in each of the personal computers PC1~PCn, and the folder number (No.1 or the like), the folder's location and a password are registered for each image data storing folder. The password need not necessarily registered.

The content (image data storing folder setting data) registered on the folder setting screen is stored in the personal computer concerned. The image data storing folder setting data can be changed and deleted on the folder setting screen.

FIG. 17 shows an example of a Web Page (destination administrating data registering screen) provided by the digital copying machine 1 when a predetermined user accesses the digital copying machine 1 using the Web Browser function of one of the personal computers PC1~PCn.

The user registers each image data storing folder registered in all of the personal computers PC1~PCn on this destination administrating data registering screen.

In other words, for each image data storing folder, the folder name (Folder 1 or the like), the network address of the personal computer in which the image data storing folder is formed, and the folder number (No. 1 or the like) of the image data storing folder are registered.

The content (destination administrating data) registered on the destination administrating data registering screen is stored in the digital copying machine 1.

Figure 18:
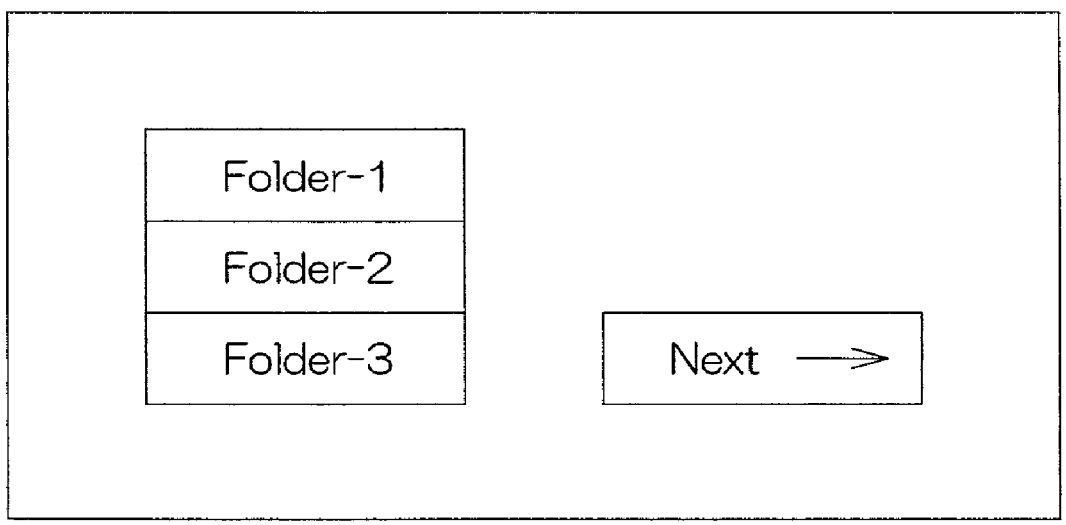
FIG. 18 is a schematic view showing an example of a destination folder selecting screen displayed in the operating section of the digital copying machine 1.

FIG. 18 shows an example of a destination folder selecting screen displayed in the operating section of the digital copying machine 1. On the destination folder selecting screen, a list of folder names (Folder 1 and the like) is displayed.

Figure 19:
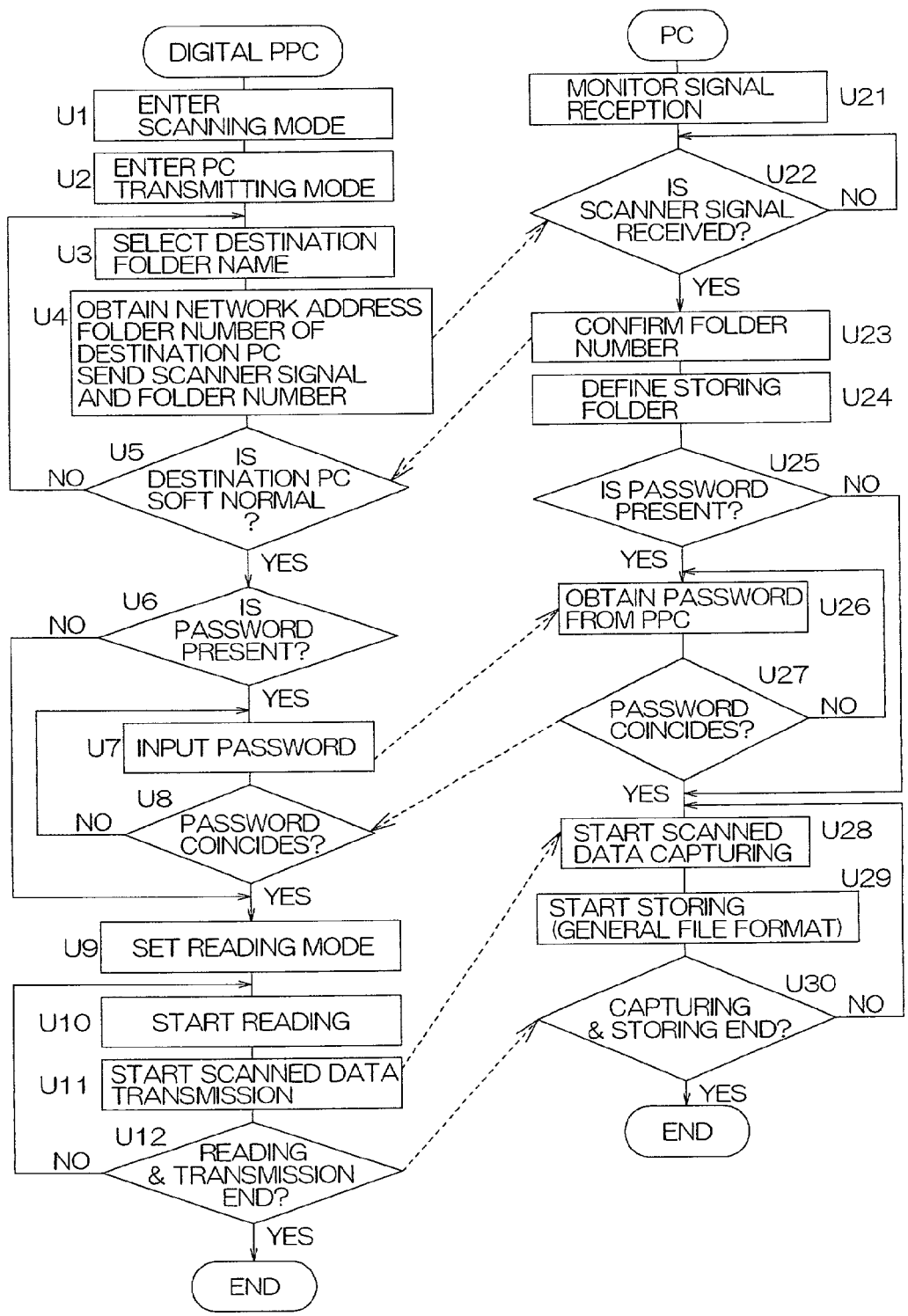
FIG. 19 is a flow chart showing the procedure of operations of the digital copying machine 1 and a personal computer for storing data read by the digital copying machine 1 as an image file in the folder in the personal computer specified by a user.

FIG. 19 shows the procedure of operations of the digital copying machine 1 and a personal computer for storing data read by the digital copying machine 1 as an image file in a predetermined folder in the personal computer specified by a user.

First, operation of the digital copying machine 1 will be described.

The digital copying machine enters a scan mode by user operation (step U1). Further, the digital copying machine 1 enters a PC transmission mode in the scan mode by user operation(step U2).

When the digital copying machine 1 enters the PC transmission mode, the destination folder selecting screen as shown in FIG. 18 is displayed, and the user selects a folder name (hereinafter referred to as destination folder name) corresponding to an image data storing folder which is the destination for transmitting the image data (step U3).

When the destination folder name is selected, the network address and the folder number of the destination personal computer are obtained on the basis of the destination administrating data (see FIG. 17) (step U4). Then, a scanner signal and the folder number are sent to the destination personal computer.

When the destination personal computer receives the scanner signal and the folder number, the destination personal computer sends a confirming signal to the digital copying machine 1.

Depending upon whether the confirming signal is sent or not, it is judged whether an image data receiving application software in the destination personal computer properly operates or not (step U5).

When the image data receiving application software is judged to properly operate, it is judged by querying to the destination personal computer whether a password is set in the destination folder (step U6). When any password is not set in the destination folder, the program proceeds to step U9.

When a password is set in the destination folder, a password input screen is displayed so that the user can input the password set in the said destination folder. When the user inputted the password (step U7), the inputted password is sent to the destination personal computer to query it to the personal computer whether the password inputted by the user coincides with the password set in the destination folder.

Depending upon the result of the query, the digital copying machine 1 judges whether the password inputted by the user coincides with the password set in the destination folder (step U8).

When the two passwords do not coincide with each other, the program returns to step U7. And when they coincide with each other, the program proceeds to step U9.

At step U9, on the basis of user operation, the program enters an original read mode to start image data reading and at the same time start transmitting the read image data to the destination personal computer (steps U10, 11).

When all the image data reading and transmission are completed in such a manner (YES at step 12), this time operation ends.

Now, operation of the personal computer PC1 will be described in the following.

The personal computer always monitors signals sent from the digital copying machine 1 (step U21). when receiving the scanner signal and the folder number sent from the digital copying machine 1 at step U4 (YES at step U21), the personal computer sends a receipt signal to the digital copying machine 1 and at the same time confirms the incoming folder number (step U23).

Then, on the basis of the folder number and the image data store folder setting data (see FIG. 16), the personal computer PC1 defines the destination image data store folder (step U24) and at the same time judges whether a password is set in the destination image data store folder or not (step U25). The personal computer sends the result of the judgment to the digital copying machine 1 in response to the query from the digital copying machine 1 whether a password is set or not at step U6. When any password is not set, the program proceeds to step U28.

When a password is set in the image data store folder, the personal computer obtains the password inputted by the user from the digital copying machine 1 (step U26), then judges whether the obtained password coincides with the passwords set in the image data store folder (step U27), and sends the result of the judgment to the digital copying machine 1.

When the two passwords coincide with each other, the program proceeds to step U28. At step u28, the personal computer starts capturing the image data sent from the digital copying machine 1. And the personal computer starts storing the captured image data in the destination store folder (step U29).

When the operation of capturing all the image data and storing the same in the destination store folder are completed in this way (YES at step U30), this time operation ends.

In the abovementioned embodiment, without accessing directly the folder in the personal computer from the digital copying machine 1, image data are transmitted to the image data receiving software in the personal computer and the image data receiving software in the personal computer stores the image data in the destination store folder. Accordingly, image data read by the digital copying machine 1 can be stored in a private folder other than folders which an operating system on the personal computers publishes on the network as shared folders. Therefore, the image data stored by a user in his personal computer can be protected from the risk of being viewed by others.

Further, a user can utilize image data stored directly in a personal computer, applications uncorresponding to the network can directly utilize the image data.

Further, by setting a password in an image data storing folder as abovementioned, it can be prevented that unnecessary data sent from the digital copying machine 1 are stored in an image data store holder in the personal computer through operation of the digital copying machine 1 by others than the user.

Furthermore, since the location of the image data store folder can be changed only by changing the image data store folder setting data on the personal computer side, operation of changing the location of the image data store folder is very simple.

A color digital copying machine 1 is used as a scanner apparatus in the abovementioned embodiment, but a scanner apparatus itself having no copying function can be used, and a facsimile apparatus capable of high-speed reading or the like can be also used, of course.

Further, since the digital copying machine 1 used in this network system has a copying function in addition to the abovementioned original reading function, naturally it can be used as a copying machine.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A push type scanner apparatus capable of transmitting image data over a network to any of a plurality of data processing apparatus, at least one of the data processing apparatuses having personal address book data set therein, said scanner apparatus comprising:
   an original scanner for reading an original set in the push type scanner apparatus and outputting image data of an image on a surface of the original,
   a network connecting interface for connecting the push type scanner apparatus to the network,
   an address specifying means for specifying a destination address designating a destination for transmitting the image data through the network,
   a mail creating means for creating mail to be transmitted to the address specified by the address specifying means,
   an appended file creating means for creating, when the original is read by the original scanner, an appended file comprising the image data of the original to be appended to the mail created by the mail creating means,
   a transmission executing means for outputting the created mail and the appended file through the network connecting interface to the network,
   a user data memory that registers user data of the data processing apparatuses having the personal address book data set therein,
   an address book data obtaining means for obtaining personal address book data from said at least one of the data processing apparatuses by referring to the user data memory in response to entered user data and a password,
   a general memory for temporarily storing obtained personal address book data,
   wherein the address specifying means specifies an address from the obtained personal address book data as the destination address.

2. A push type scanner apparatus as claimed in claim 1, further comprising an additional data inputting means for inputting additional data to be added to image data for database processing.

3. A push type scanner apparatus as claimed in claim 1, further comprising a store means for storing the destination addresses to which image data transmission is limited on the basis of the domain name of each of the said destination addresses, and a transmission limiting means for limiting image data transmission to a destination address by corresponding the domain name of the destination address to the domain names stored in the store means.

4. A push type scanner apparatus as claimed in claim 1, further comprising a storing means for storing the destination addresses to which the image data transmission is permitted on the basis of the domain name of each of the said destination addresses, and a transmission permitting means for permitting the image data transmission to a destination address by corresponding the domain name of the destination address to the domain names stored in the storing means.

5. A push type scanner apparatus as claimed in claim 1, further comprising a set expression storing means for storing set expressions used for creating a text writing of a mail.

6. A push type scanner apparatus capable of transmitting image data over a network to any of a plurality of data processing apparatus, at least one of the data processing apparatuses having personal address book data set therein, said scanner apparatus comprising:
   an original scanner for reading an original set in the push type scanner apparatus and outputting image data representing an image on a surface of the original;
   a network connecting interface for connecting the push type scanner apparatus to the network;
   an address specifying means for specifying a destination address from personal address book data or shared destination data to designate a destination for transmitting the image data through the network;
   a control means, said control means
      causing creation of mail to be transmitted to the address specified by the address specifying means,
      causing creation of an appendable file including the image data representing the original and causing appending of the appendable file to a created mail after the original has been read by the original scanner, and
      causing transmission of the created mail and the file appended thereto through the network connecting interface;
   a first memory for storing the shared destination data;
   a second memory that stores data representing a user of said at least one data processing apparatus having personal address book data set therein; and
   a third memory for temporarily storing a destination given by the personal address book data,
   wherein the control means further causes
      obtaining of the personal address book data from said at least one of the data processing apparatus by referring to the second memory in response to entry of user data and a password, and
      temporary storing of the personal address book data in the third memory.

* * * * *